United States Patent [19]

Doi

[11] Patent Number: 5,493,664
[45] Date of Patent: Feb. 20, 1996

[54] MICROCOMPUTER THAT TRANSFERS ADDRESS AND CONTROL TO A DEBUGGING ROUTINE WHEN AN INPUT ADDRESS IS A BREAKPOINT ADDRESS AND A USER ACCESSIBLE REGISTER FOR SIGNALLING IF THE BREAKPOINT ADDRESS IS FROM THE CACHE MEMORY OR A MAIN MEMORY

[75] Inventor: Toshio Doi, Hyogo, Japan

[73] Assignee: Mitsubishi Denki Kabushiki Kaisha, Tokyo, Japan

[21] Appl. No.: 4,825

[22] Filed: Jan. 15, 1993

[30] Foreign Application Priority Data

Jan. 24, 1992 [JP] Japan .................................. 4-034380

[51] Int. Cl.⁶ ..................................................... G06F 12/00
[52] U.S. Cl. ........................ 395/427; 395/445; 395/452; 395/453; 395/483; 364/238.4; 364/243.41; 364/253.2; 364/267.91; 364/926.92; 364/964.22; 364/964.23; 364/967.2; 364/DIG. 1; 364/DIG. 2
[58] Field of Search ...................................... 395/425, 427, 395/445, 452, 453, 483; 364/200 MS File, 900 MS File, 238.4, 243.41, 253.2, 267.91, 926.92, 964.22, 964.23, 967.2

[56] References Cited

U.S. PATENT DOCUMENTS

| | | | |
|---|---|---|---|
| 4,675,646 | 6/1987 | Lauer | 340/146.2 |
| 5,218,707 | 6/1993 | Little et al. | 395/800 |
| 5,263,153 | 11/1993 | Intrater et al. | 395/575 |
| 5,313,608 | 5/1994 | Takai | 395/425 |
| 5,327,567 | 7/1994 | Johnson | 395/775 |

Primary Examiner—Tod R. Swann
Assistant Examiner—Frank Asta
Attorney, Agent, or Firm—Townsend and Townsend and Crew

[57] ABSTRACT

A processor according to the present invention includes a user-accessible 1 bit register for indicating, upon instruction breaking or data breaking occurring, whether any instruction or data to be debugged is existent in a cache memory or in a memory, and the 1 bit register possesses a bit issued correspondingly to a hit signal issued from the cache memory, whereby it can be known with each whether the instruction or data is existent in the cache memory or in the memory.

6 Claims, 5 Drawing Sheets

MICROCOMPUTER THAT TRANSFERS ADDRESS AND CONTROL TO A DEBUGGING ROUTINE WHEN AN INPUT ADDRESS IS A BREAKPOINT ADDRESS AND A USER ACCESSIBLE REGISTER FOR SIGNALLING IF THE BREAKPOINT ADDRESS IS FROM THE CACHE MEMORY OR A MAIN MEMORY

BACKGROUND OF THE INVENTION

1. Field of the Invention

The present invention relates to a processor, and more particularly to a system processor including a memory and a cache memory therein.

2. Description of the Prior Art

Referring to FIG. 5, there is illustrated a view of a system arrangement exemplarily illustrating a prior art processor. In the figure, designated at 1 is an instruction fetch section as instruction read means for reading an instruction, 2 is an instruction fetch program counter for indicating the address of any instruction read in by the instruction fetch part 1, 3 is an instruction break point register as an instruction break pointer, 4 is a comparator for comparing the instruction fetch program counter 2 with the instruction break point register 3, 5 is a decoder section as instruction decoder means for decoding any instruction, 6 is a decode program counter for indicating the address of any instruction being decoded in the decoder part 5, 7 is a 1 bit register for indicating a result of comparison between the instruction fetch program counter 2 and the instruction break point register 3 concerning any instruction being decoded in the decoder section 5, 8 is an operand fetch section as data access means for accessing data, 9 is an operand fetch program counter for indicating the address of any instruction using data accessed by the operand fetch part 8, 10 is a 1 bit register for indicating a result of comparison between instructions at the instruction fetch program counter 2 and the instruction break point register 3, each instruction employing data accessed by the operand fetch section 8, 11 is an operand register as data address designation means for indicating the address of the data accessed by the operand fetch section 8, 12 is a data break point register as a data break pointer, 13 is a comparator for comparing the contents in the data break point register 12 and in the operand register 11, 14 is an execution section for executing operations and the like, 15 is a program counter for indicating the address of any instruction in running, 16 is a 1 bit register for indicating a result of comparison between instructions in running at the instruction fetch program counter 2 and the instruction break point register 3, 17 is a 1 bit register for indicating a result of comparison between instructions in running at the data break point register 12 and the operand register 11, 18 is a memory for storing instructions and data, 19 is a cache memory for storing part of contents in the memory 18, 26 is a memory controller for controlling the cache memory 19, 27 is an access completion signal issued from the memory controller 26 to a microprocessor 21, and 28 is a hit signal issued from the cache memory 19 to the memory controller 26. Herein, the memory 18 and the cache memory 19 are external to the microprocessor 21 in the present example.

Operation of the prior art processor is as follows.

Referring again to FIG. 5, the microprocessor 21 transmits and receives information to and from the memory 18 and other peripheral devices (not shown) for processing of the same. An access speed to the memory 18 is typically lower than a processing speed of the microprocessor 21, and hence the memory controller 26 generally stores part of contents of the memory 18 in the higher access speed cache memory 19.

Debugging is frequently required for development of programs and systems by interrupting the running of a user program in the course of programming and by an access to particular data. Accordingly, the prior art processor includes the instruction break point register 3 as an instruction break pointer and the data break point register 12 as a data break pointer. To the instruction break point register 3 an address in the user program desired to be interrupted is set, and to the data break point register 12 an address in the user program desired to be interrupted as being read or written is set.

Execution of a program in the prior art processor is as follows. An address in the program is set to the instruction fetch program counter 2 in the instruction fetch section 1 of the microprocessor 21. The instruction feth section 1 informs the bus interface 20 of the address, which interface 20 in turn instructs the memory controller 26 to read out the address. The memory controller 26 judges whether or not the address is existent in the cache memory 19. More specifically, once the address is supplied to the cache memory 19, and the cache memory 19 stores therein information concerning the foregoing address, it issues a hit signal 28, and otherwise does not issue such a signal. Provided the foregoing address is existent in the cache memory 19, the memory controller 26 does not read the address from the memory 18 but reads an instruction in the cache memory 19. Thereupon, the access completion signal 27 is issued in the shortest time. Contrarily, provided there is not existent the associated address in the cache memory 19, the memory controller 26 reads the associated address from the memory 18 and updates the contents in the cache memory 19 at need. Thereupon, the access completion signal 27 is issued not in the shortest time but after a necessary time. Further, the comparator 4 compares the instruction fetch program counter 2 with the instruction break point register 3. A count value by the instruction fetch program counter 2 in the instruction fetch section 1 is sent to the decode program counter 6 in the decoder section 5, and a result of the comparison by the comparator 4 sent to the 1 bit register 7, and further the instruction read by the memory controller 26 sent to the decode section 5 through the bus interface 20.

The decoder section 5 decodes the instruction. The count value of the decode program counter 6 in the decoder section 5 is sent to the operand fetch counter 9, the value in the 1 bit register 7 sent to the 1 bit register 10, and the instruction information decoded by the decode section 5 is sent to the operand fetch section 8. In this instruction information, data used by the instruction or the address at which a result of the instruction is stored is set to the operand register 11.

The operand fetch section 8 informs the bus interface 20 of the address of the data used by the instruction, and the bus interface 20 instructs the memory controller 26 to read out the associated address. The memory controller 26 judges whether or not the associated address is existent in the cache memory 19. More specifically, with the address being sent to the cache memory 19, if the cache memory 19 holds therein information concerning the address, it issues a hit signal 28 while unless it holds the same, it issues no hit signal 28. Provided the associated address is existent in the cache memory 19, the memory controller 26 does not read that address from the memory 18, but reads out an instruction in the cache memory 19. Thereupon, the access completion signal 27 is issued in the shortest time. Unless the associated address is existent in the cache memory 19, the memory controller 26 reads out the associated address from the memory 18 and updates the contents in the cache memory 19 at need. In this case, the access completion signal 27 is issued not in the shortest time but after the elapse of a required time. Further, the comparator 13 compares the operand register 11 with the data break point register 12. Thereafter, the operand fetch program counter 9 in the operand fetch section 8 is fed to the program counter 15 in the execution section 14, the 1 bit register 10 fed to the 1 bit register 16, a result of comparison in the comparator 13 fed to the 1 bit register 17, and instruction information decoded by the decoder section 5 and the data read out by the memory controller 26 are fed to the execution section 14 through the bus interface 20.

If the 1 bit register 16 and the 1 bit register 17 are not zero, then the execution section 14 executes the instruction using the instruction information decoded by the decoder section 5 and the data read out through the bus interface 20. The operand fetch section 8 informs the bus interface 20 of an address at which an instruction result is stored, which interface 20 in turn instructs the memory controller 26 to write the instruction result at a location of the associated address. The memory controller 26 updates the contents in the cache memory 19 and in the memory 18, at need.

The instruction fetch program counter 2 is successively incremented as the program is sequentially executed or a new value is set thereto in conformity with the instruction. The instruction fetch section 1, decoder section 5, operand fetch section 8, execution section 14, and bus interface 20 process the program concurrently or sequentially.

Provided the 1 bit register 16 or 1 bit register 17 in the execution section 14 is 0, the execution section 14 interrupts its execution of the instruction and sets an address of a debugging routine to the instruction fetch program counter 2. Information concerning the decoder section 5, operand fetch section 8, and execution section 14 is ignored at this time. A user performs debugging using a debugging routine. It is possible here to know that the interruption of the execution of the instruction originates from the data or the instruction with reference to the 1 bit register 17 and the 1 bit register 16.

There are included as the cache memory 19 those of storing only instructions, those of storing instructions and data without distinguishing those signals, and those of storing separately instructions and data. There are herein supposed those of storing instructions and data without distinguishing those signals and those of storing separately instructions and data. However, provided those of storing only instructions are supposed as the cache memory 19, the memory controller 26 surely accesses the memory 18 but does not access the cache memory 19 when there are performed readout and write operations in the operand fetch section 8.

With the arrangement described above, the prior art processors however suffer from a difficulty: Although the contents in the cache memory 19 are successively updated in conforming with the types of the cache memory 19, there is no means for simply knowing whether instructions and data to be debugged are existent in the cache memory 19 or existent in the memory 18. It is therefore difficult to adjust the effect of the cache memory 19 in detail upon any program and system being debugged. More specifically, the cache memory 19 stores therein instructions or data to which many accesses are taken and of which frequent use is made as well as stores instructions or data to which less accesses are taken, but storage of frequently used instructions and data in the cache memory 19 and in turn locking of the same rather cause those instructions or data to be accessed in a short time and hence access time to be shortened as a whole. It is however impossible in the prior art to know whether any read instruction or data is existent in the cache memory 19 or in the memory 18. It is therefore impossible to know the number of times of accesses to any specific instruction or data from the cache memory 19. This makes it impossible to lock frequently used instructions or data in the cache memory 19. The locking herein means that when the cache memory 19 is fully filled with information, the associated instruction or data is stored therein over a long time and instructions or data other than the associated one are driven out.

Summary of the Invention

In view of the drawbacks with the prior art, it is an object of the present invention to provide a processor in which means is presented for simply knowing whether any instruction or data to be debugged is existent in the cache memory 19 or in the memory 18, and hence fine adjustment of the effect of the cache memory 19 upon debugging of any program and any system can be facilitated.

In accordance with the present invention, a processor according to the first invention includes a user-accessible register (1 bit registers 24) which indicates upon instruction breaking occurring whether the instruction is provided from the cache memory 19 or from the memory 18.

A processor according to the second invention includes a user-accessible register (1 bit register 25) which indicates upon data breaking occurring whether the data is existent in the cache memory 19 or in the memory 18.

In a processor according to the third invention said registers (1 bit registers 24, 25) have a bit generated correspondingly to the hit signal 28 issued by the cache memory 19.

In a processor according to the fourth invention, said registers (1 bit registers 24, 25) have a bit generated responsibly to whether or not the access of the processor (microprocessor 21) to the outside is executed in a shortest time.

A processor according to the fifth invention includes a counter 31 for counting the number of cycles which an access of the processor (microprocessor 21) to the outside requires, a register 32 which holds a preset value, and a comparator (access controller 29) which compares the counter 31 with the preset value to set to 1 the bits of the user-accessible registers (1 bit registers 24, 25) when the counter value is larger than the preset value.

In a processor according to the sixth invention, a plurality of the cache memories 19 are provided, and said register has a plurality of bits corresponding to those cache memories 19.

In a processor according to the seventh invention, said cache memory 19 is included in the processor (microprocessor 21).

In accordance with the processor of the first invention, the user-accessible register (1 bit register 24) stores therein upon instruction breaking occurring a judgement result indicating whether the instruction is provided from the cache memory 19 or from the memory 18.

In accordance with the processor of the second invention, the user-accessible register (1 bit register 25) stores therein upon associated data being broken a judgement result indicating whether the data is provided from the cache memory 19 or from the memory 18.

In accordance with the processor of the third invention, the foregoing bit held by each register (1 bit register 24 or 25) is generated corresponding to the hit signal 28 generated by the cache memories.

In accordance with the processor of the fourth invention, the bit in the foregoing registers (1 bit registers 24, 25) is issued in response to whether or not the access of the processor (microprocessor 21) to the outside is executed in a shortest time.

In accordance with the processor of the fifth invention, the counter 31 counts the number of cycles required for the access by the processor (microprocessor 21) to the outside, and the comparator (access controller 29) compares the counter 31 with the preset value stored in the register 32 to set to 1 the bits in the user accessible registers (1 bit registers 24, 25) when the count value is greater than the preset value.

In accordance with the processor of the sixth invention, a plurality of the bits stored in the register hold a judgement result corresponding to each of plurality of the cache memories 19.

In accordance with the memory of the seventh invention, the register (1 bit register 24, 25) holds the foregoing judgement result corresponding to the cache memory 19 included in the processor (microprocessor 21).

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Figure 1:
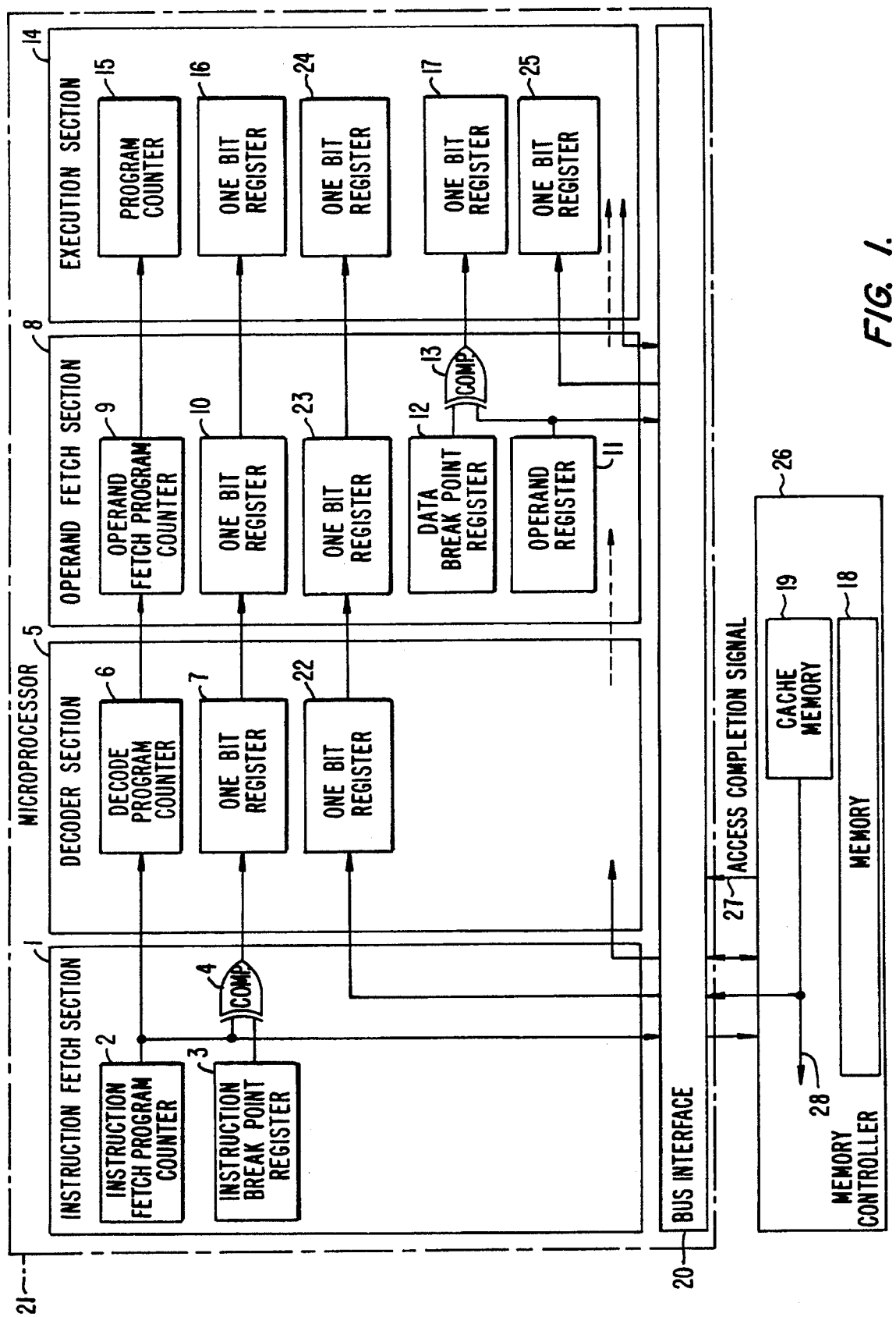
FIG. 1 is a block diagram illustrating the arrangement of a preferred embodiment of a processor according to the present invention.
Figure 5:
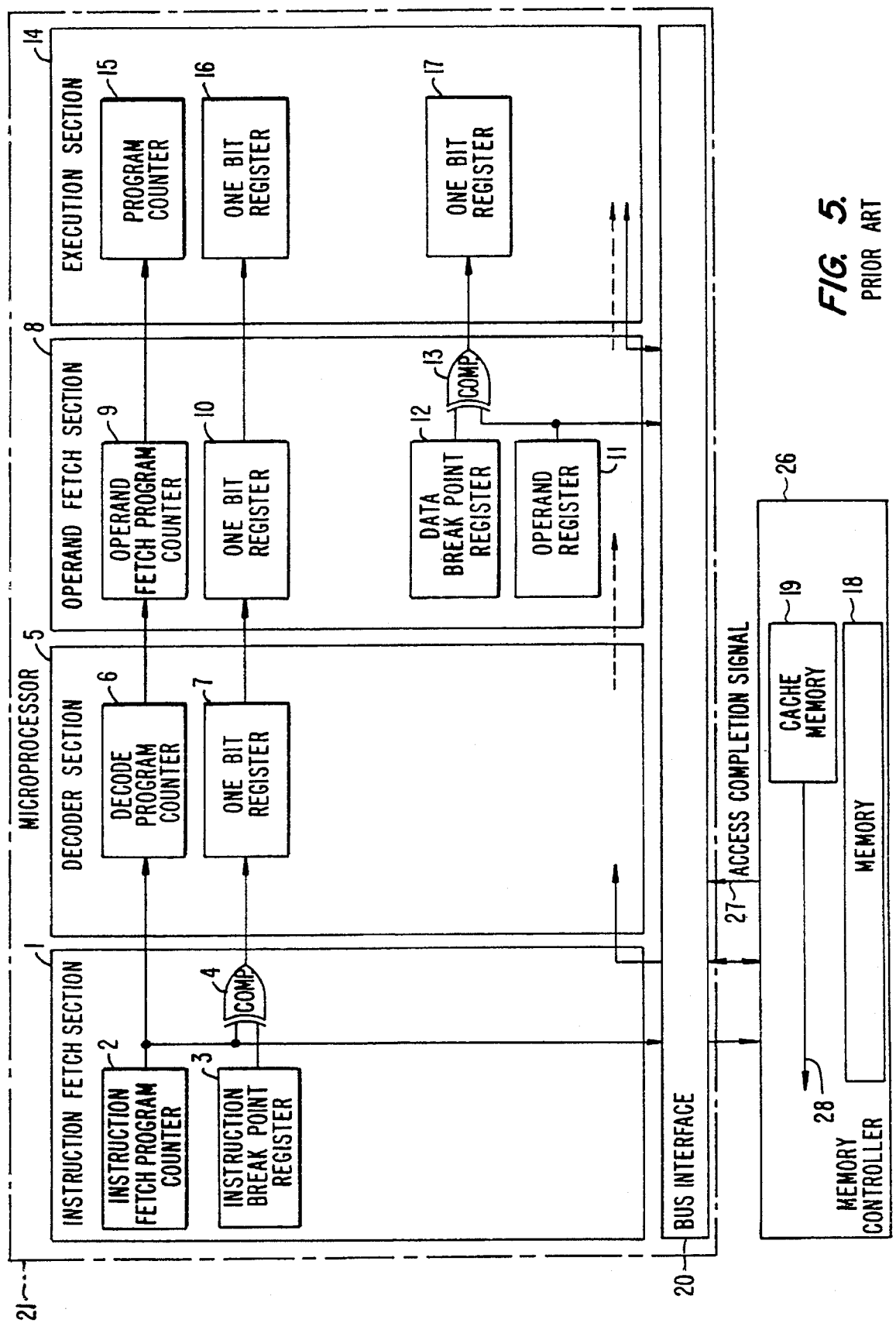
FIG. 5 is a block diagram illustrating in an exemplary manner a prior art processor.

Referring to FIG. 1, a preferred embodiment of a processor according to the present invention is illustrated, in which like symbols shall be applied to like portions as those in FIG. 5. In FIG. 5, designated at 28 is a hit signal issued from the cache memory 19 to the memory controller 26 likewise the prior art, and in the present embodiment the hit signal is inputted also to the bus interface 20 of the microprocessor 21 serving as the present processor. Numeral 22 indicates a 1 bit register provided anew in the decoder section 5, 23 indicates a 1 bit register provided anew in the operand fetch section 8, and 24 is a user-accessible 1 bit register provided anew in the execution section 14 to which the hit signal 28 is inputted through the bus interface 20 and the 1 bit registers 22, 23 and which indicates upon an instruction being broken whether or not the instruction is existent in the cache memory 19 or in the foregoing memory 18, in accordance with the first invention. Numeral 25 is a user-accessible 1 bit register provided anew in the execution section 14, to which the bit signal 28 is inputted through the bus interface 20 and which indicates upon data being broken whether or not the data is existent in the cache memory 19 or in the memory 18, in accordance with the second invention. Furthermore, the foregoing user-accessible 1 bit registers 24, 25 have a bit generated corresponding to the foregoing hit signal 28, in accordance with the third invention.

In the following, operation of the embodiment will be described. The instruction fetch section 1 informs the bus interface 20 of a head address of a program, and the bus interface 20 instructs the memory controller 26 to read out an associated address. The memory controller 26 judges whether or not the associated address is existent in the cache memory 19, and supplies through the bus interface 20 the 1 bit register 22 in the decoder section 5 with the hit signal 28 being a judgement result issued from the cache memory 19. The bit of the 1 bit register 22 is generated in response to the hit signal 28.

The decoder section 5 decodes the supplied instruction. At this time, the contents in the 1 bit register 22 are supplied to the 1 bit register 23 in the operand fetch section 8. The operand fetch section 8 informs the bus interface of an address of data used by the instruction, and the bus interface 20 instructs the memory controller 26 to read out the associated address. The memory controller 26 judges whether or not the associated address is existent in the cache memory 19, and supplies the 1 register 25 in the execution section 14 with the hit signal 28 being a judgement result on the cache memory 19 through the bus interface 20. Herein, the execution section 14 executes the instruction, provided the 1 bit registers 16 and 17 are not 0, using the information concerning the instruction decoded in the decoder section 5 and the data read by the bus interface 20. Provided in the execution section 14 the 1 register 16 or 17 is zero, the execution section 14 stops its execution of the instruction and sets an address of a debugging routine to the instruction fetch program counter 2. At this time, informations in the decoder section 5, the operand fetch section 8, and the execution section 14 are made invalid.

As in the prior art case, the user performs debugging using a debugging routine. It can not only be known at this time with reference to the 1 bit registers 16 and 17 that the cause of the interruption of the instruction execution originates from the instruction or the data, but also be known with reference to the accessible 1 bit registers 24 and 25 whether the instruction and data to be debugged are existent in the cache memory 19 or in the memory 18.

Figure 2:
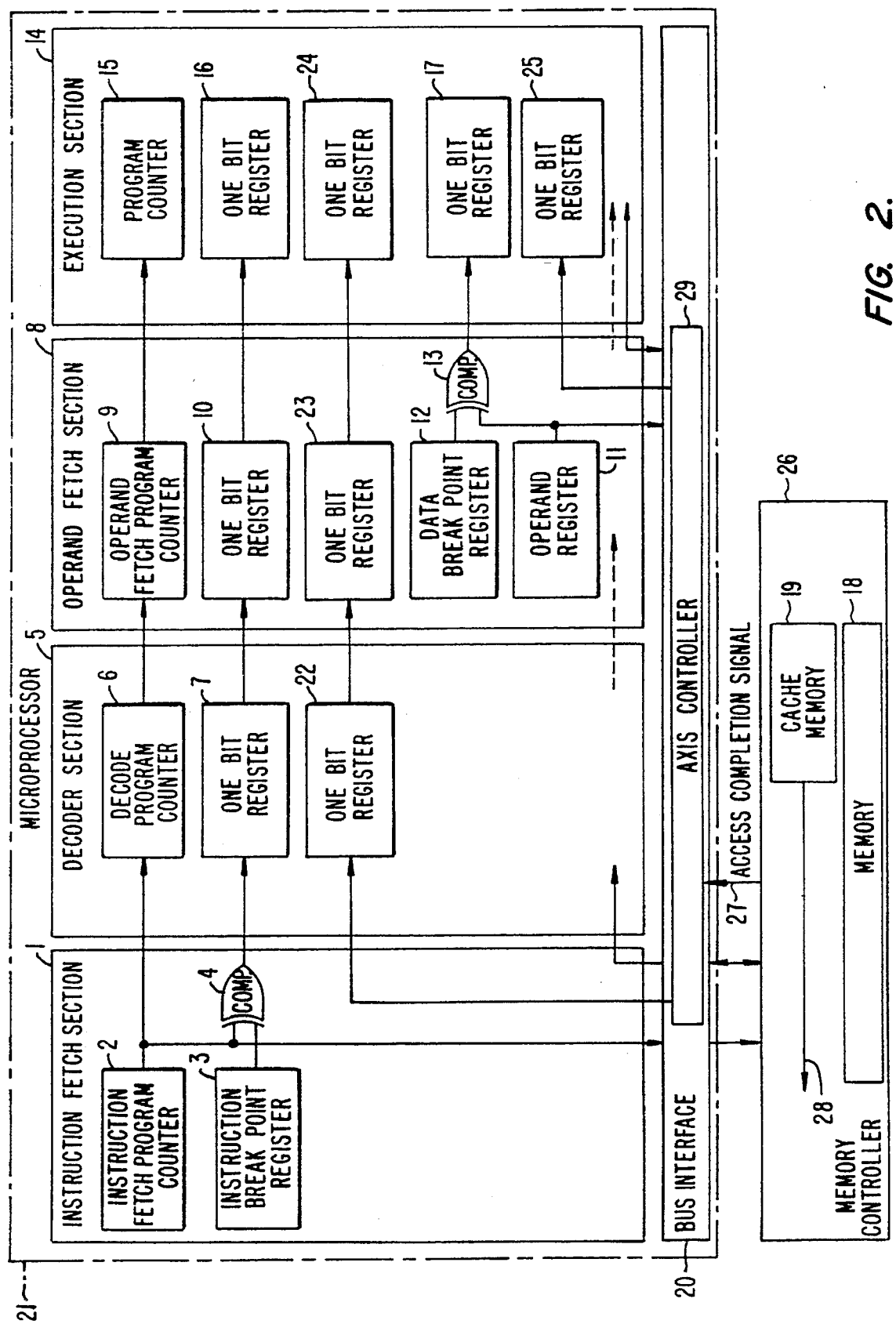
FIG. 2 is a block diagram illustrating the arrangement of another preferred embodiment of the processor according to the present invention.

Referring to FIG. 2, there is illustrated another embodiment of the processor according to the present invention. In the figure, like symbols shall be applied to like portions as those in FIG. 1, and the description thereof will be omitted in proper.

In the figure, numeral 21 indicates a microprocessor as the present processor, 29 indicates an access controller provided in the bus interface 20 for counting the access time by the microprocessor 21 to the outside 27 indicates an access completion signal issued by the memory controller 26 to the microprocessor 21, which signal is inputted to the access controller 29 in the bus interface 20 of the microprocessor 21. Further, likewise the first embodiment, there are provided 1 bit registers 22 through 24 and 25, and the user-accessible 1 bit registers 24, 25 are supplied with the instruction from the microprocessor 21 to the outside and with the output from the access controller 29 indicative of whether or not data access is performed in a shortest time, and have a bit generated responsive to the output from the foregoing access controller 29, in accordance with the fourth invention. The access controller 29 issues 0 when the counts from the access initiation time to the time when the foregoing access completion signal 27 is inputted are the minimum counts or cycles indicative of the shortest time while it issues 1 when the counts are the counts (> minimum counts) or cycles (> minimum cycles) indicative of the data access being not performed in a shortest time.

Operation of the second embodiment is as follows. The operation described hereinafter exemplifies the case where the shortest time of the access is assumed to be the minimum cycles.

The instruction fetch section 1 informs the bus interface 20 of a head address of a program, and the bus interface 20 instructs the memory controller 26 to read out an associated address. The memory controller 26 judges whether or not the associated address is existent in the cache memory 19, and issues the access completion signal in a shortest time provided the associated address is existent in the cache memory 19. The access controller 29 issues 0 to the 1 bit register 22 because the counts from the access initiation time to the time when the access completion signal 27 is inputted is the minimum cycles. Provided the associated address is not existent in the cache memory 19, the memory controller 26 outputs the access completion signal 27 in a time required for the access. The access controller 29 issues 1 to the 1 bit register 22 because the count number from the access initiation to the time when the access completion signal 27 is inputted is not the minimum cycle number.

The decoder section 5 decodes a given instruction. At this time, contents in the 1 bit register 22 are supplied to the 1 bit register 23 of the operand fetch section 8.

The operand fetch section 8 informs the bus interface 20 of an address of data used by the instruction, and the bus interface 20 instructs the memory controller 26 to read out the associated address. The memory controller 26 judges whether or not the associated address is existent in the cache memory 19, and outputs the access completion signal 27 in a shortest time provided the associated address is existent in the cache memory 19. The access controller 29 issues 0 to the 1 bit register 25 in the execution section 14 because the count number from the access initiation to the time when the access completion signal 27 is inputted is the minimum cycle number. Provided the associated address is not existent in the cache memory 19, the memory controller 26 outputs the access completion signal 27 in a time required for the access. The access controller 29 issues 1 to the 1 bit register 25 in the execution section 14 because the count number from the access initiation time to the time when the access completion signal 27 is inputted is not the minimum cycle number. When the 1 bit register 16 and the 1 bit register 17 are not 0, the execution section 14 executes the instruction using information on the instruction decoded in the decoder section 5 and data read out at the bus interface 20. Further, provided in the execution section 14 the 1 bit register 16 or the 1 bit register 17 is 0, the execution section 14 stops the execution of the instruction and sets an address of a debugging routine to the instruction fetch program counter 2. At this time, informations in the decoder section 5, the operand fetch section 8, and the execution section 14 are made invalid.

The user performs debugging using a debugging routine. At this time, it can be known whether the instruction and data to be debugged are existent in the cache memory 19 or the memory 18, with reference to the user-accessible 1 bit registers 24 and 25.

Figure 3:
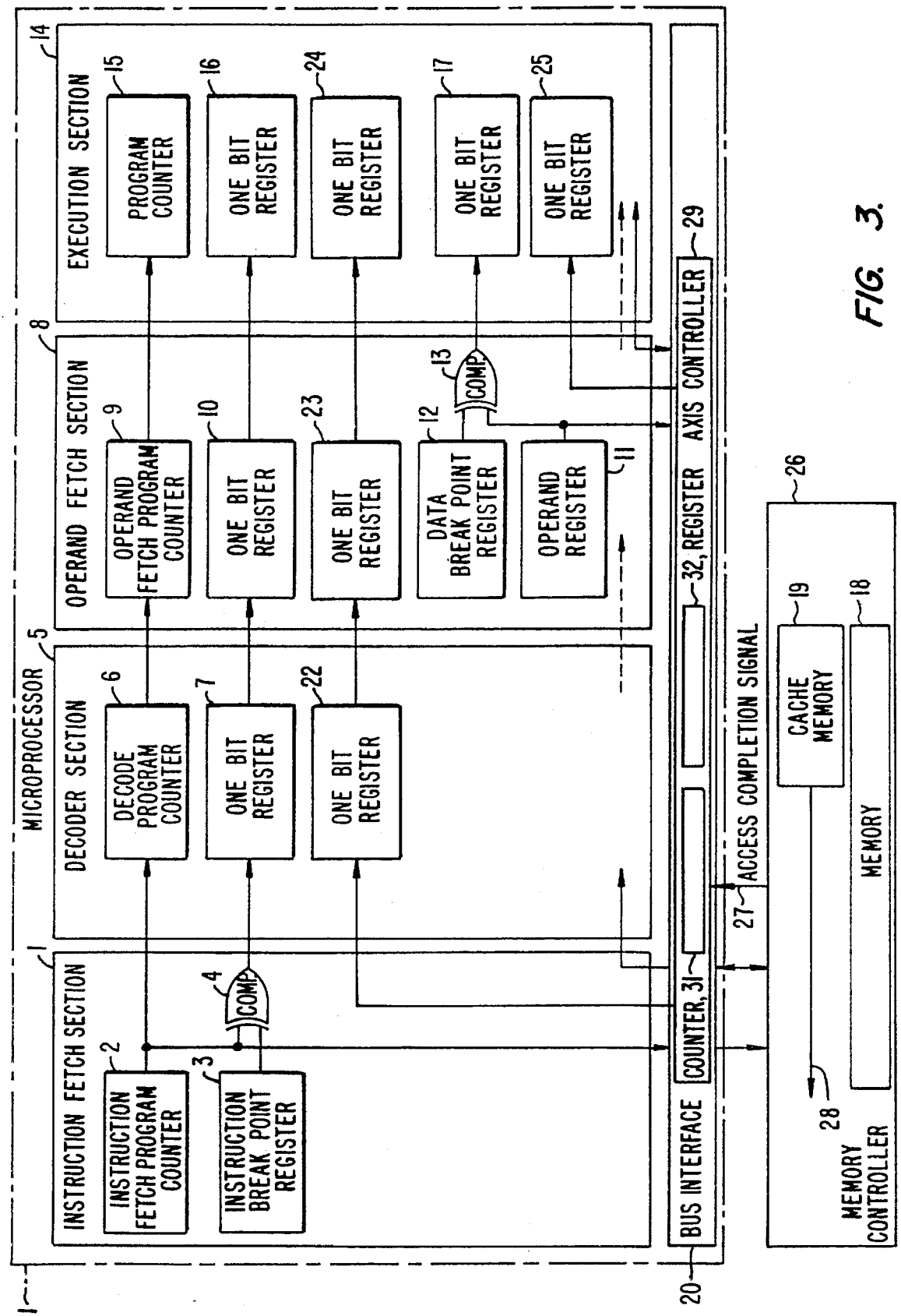
FIG. 3 is a block diagram illustrating the arrangement of further another preferred embodiment of the processor according to the present invention.

Referring to FIG. 3, further another embodiment of the processor of the present invention is illustrated. In the figure, like symbols shall be applied to like portions as those illustrated in FIG. 2 and the description thereof will be neglected in proper.

In the figure, a microprocessor 21 as the present processor includes a counter 31 for counting the number of cycles required for the access by the microprocessor 21 to the outside, a register 32 for storing a preset value, and an access controller 29 as a comparator for setting to 1 the bits of user-accessible 1 bit registers 24, 25 provided likewise the aforementioned second embodiment, the setting being done when the counter 31 and the preset value are compared and the counter value is greater than the preset value, in accordance with the fifth invention. To the access controller 29 the access completion signal 27 is inputted likewise the aforementioned second embodiment.

Operation of the third embodiment is as follows. The description will be done exemplarily for the case where there is previously set and held a preset value in the foregoing register 32, the preset value being one satisfying a relation: the minimum access speed of the microprocessor 21 ≦ the access speed of the cache memory 19 ≦ the preset value of the access controller 29 > the access speed of the memory 18. When an access by the microprocessor to the external instruction and data is performed, the memory controller 26 judges whether or not an associated address of the just-mentioned instruction or data is existent in the cache memory 19 and outputs the access completion signal 27 in the access time of the cache memory 19 provided the associated address is existent in the cache memory 19. The access controller 29 outputs 0 to the 1 bit registers 22, 25 because the count number of the foregoing counter 31 from the access initiation time to the time when the access completion signal 27 is inputted is less than the preset value held in the foregoing register 32. Provided the associated address is not existent in the cache memory 19, the memory controller 26 outputs the access completion signal 27 in a time required for the access to the memory 18. The access controller 29 outputs 1 to the 1 bit registers 22, 25 because the foregoing count number from the access initiation time to the time when the access completion signal 27 is inputted is more than the foregoing preset value. In the present embodiment, the 1 bit register 24 is supplied with the output of the access controller 29 through the preceding 1 bit registers 22, 23 and the bits of the user-accessible 1 bit registers 24, 25 are generated responsibly to the output from the access controller 29. Accordingly, the 1 bit register 24 is set to 0 and 1 on the basis of the output from the access controller 29 being a result of the comparison between the foregoing count number and the foregoing preset value. Other operation is the same as that of the aforementioned second embodiment and hence the description thereof will be neglected.

The user performs debugging using the debugging routine. At this time, it can be known with reference to the user-accessible 1 bit registers 24 and 25 whether the instruction or data to be debugged is existent in the cache memory 19 or in the memory 18.

Herein, the processor in the foregoing embodiments may be applied to a system including a plurality of the different speed cache memories 19 and a plurality of stages of the cache memories, and may be constructed thereupon such that instead of the use of the 1 bit registers in the aforementioned embodiments there is provided a register possessing a plurality of bits corresponding to a plurality of the cache memories 19 in accordance with the sixth invention, and further such that there is provided for each cache memory 19 a counter for counting the number of cycles required for the access by the microprocessor 21 to the outside. The arrangement can manifest the same effect as those of the aforementioned embodiments.

Figure 4:
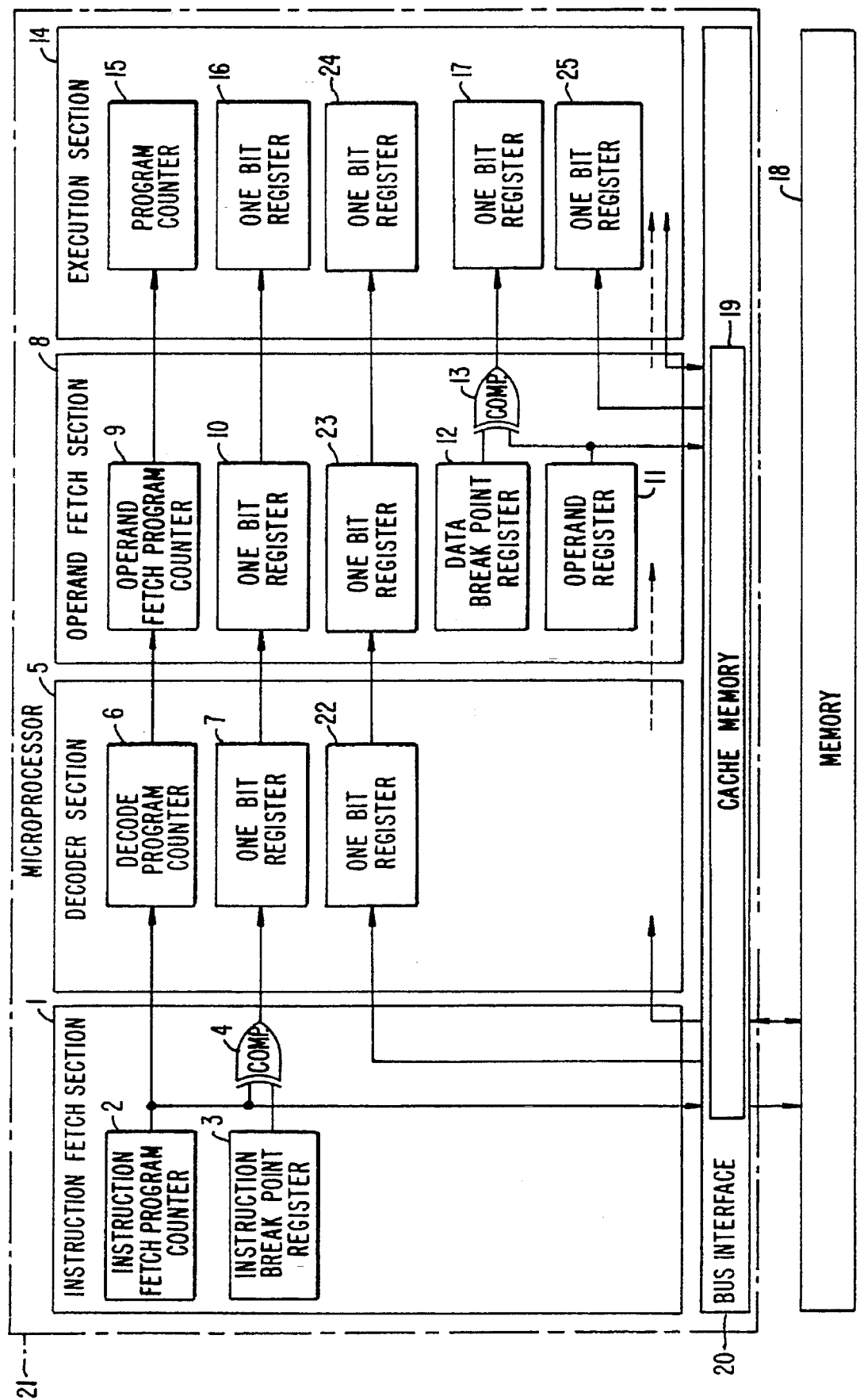
FIG. 4 is a block diagram illustrating in an exemplary manner the processor according to the present invention, the processor including therein a cache memory.

Although in the aforementioned embodiments the cache memory 19 was exemplarily of an external type, it may be constructed such that it is included in the microprocessor 21 by being for example provided in the bus interface 20 of the microprocessor 21 as illustrated in FIG. 4, in accordance with the seventh invention. The arrangement can manifest the same effect as those in the aforementioned embodiments, including other effects of, because of the cache memory 19 being capable of construction on a common one chip integrated with the microprocessor 21, the reduction of the number of external hardwares and the shortening of the access time to the cache memory 19. Additionally, such one-chip construction and commercialization thereof ensure a convenient processor applicable to varieties of systems.

Although in the aforementioned embodiments the cache memory was supposed to be a type which stores any instruction and data without distinction therebetween and a type which stores any instruction and data separately, the cache memory may include also a type which is capable of storing only any instruction. In that case, upon the read and write operation in the instruction read means 8 as in the prior art the memory controller 26 merely takes an access to the memory 18 but does not take an access to the cache memory 19 and hence the 1 bit register 25 is meaningless and unnecessary.

Although in the aforementioned embodiments the 1 bit register 24 and the 1 bit register 25 were provided independently, they may be assembled into a less bit number in a combination with the 1 bit registers 16 and 17.

Additionally, although the processor was constructed with the four-stage pipeline, it is realizable with other arrangement.

In accordance with the first and second inventions, as described above, these are provided the user-accessible register for indicating, upon any instruction being broken, whether the instruction is provided from the foregoing cache memory or from the foregoing memory, and provided the user-accessible register for indicating, upon any data being broken, whether the data is existent in the foregoing cache memory or in the foregoing memory. Accordingly, a user can be informed with ease with reference to the foregoing register of whether the instruction and data to be debugged are existent in the cache memory or in the memory and hence fine adjustment of the effect of the cache memory can be facilitated upon a program and a system being debugged. Thus, the process or is ensured which can also improve the perform and of the debugging.

In accordance with the third through fifth inventions, the user-accessible register has a bit generated correspondingly to the hit signal issued from the cache memory, or responsive to the fact that the access by the processor to the outside is performed in a shortest time or not performed, or responsive to an output from the comparator by providing the counter for counting the number of cycles required for the access by the processor to the outside, the register for storing the preset value, and the comparator for comparing the counter and the preset value and setting to 1 the bit of the user-accessible register when the counts are greater than the preset value. Thus, the foregoing effect is realizable with a highly reliable system and by the addition of the reduced number of hardwares.

In accordance with the sixth invention, a plurality of the foregoing cache memories are provided and the foregoing register possesses a plurality of bits corresponding to the cache memories. Accordingly, the invention is applicable to a processor including a plurality of the different speed cache memories and a plurality of stages of the cache memories.

Furthermore, in accordance with the seventh invention, the foregoing cache memory is included in the processor. Accordingly, in addition to the realization of the aforementioned effect the cache memory can be constructed integrally with the processor on a common one-chip. Thus, a convenient processor is ensured in which the number of external hardwares is reduced and which is applicable to varieties of systems.

What is claimed is:

1. A microcomputer, including a processor for executing instructions, said microcomputer comprising:

a main memory for storing therein a plurality of instructions;

a cache memory, coupled to said main memory, for storing therein a subset of the plurality of instructions stored in said memory, where the processor specifies an address of an instruction to be executed and executes an instruction provided by said cache memory when the instruction to be executed is included in the subset stored in said cache memory and executes an instruction provided by said main memory otherwise;

a memory controller, coupled to the cache, for issuing a hit signal when an instruction to be executed is provided by said cache memory;

an instruction break pointer, coupled to receive the address of an instruction to be executed, for transferring control to a debugging routine when the address of an instruction to be executed is a breakpoint address held by said instruction break pointer; and a user-accessible register, coupled to said memory controller and responsive to said hit signal, for holding a bit indicating whether an instruction to be executed is provided by said cache memory or said main memory so that the accessible register indicates whether an instruction specified by said breakpoint address is provided by said cache memory or said main memory when control is transferred to the debugging routine.

2. A microcomputer, including a processor for processing data elements, said microcomputer comprising:

a main memory for storing a plurality of data elements;

a cache memory, coupled to said main memory, for storing a subset of the plurality of data elements stored in said main memory, where the processor specifies an address of a data element to be processed and processes a data element provided by said cache memory when the data element is included in said subset and processes a data element provided by said main memory otherwise;

a memory controller, coupled to the cache, for issuing a hit signal indicating whether a data element to be processed is provided by said cache memory;

a data break pointer, coupled to receive the address of a data element to be processed, for transferring control to a debugging routine when the address of a data element to be processed is a data breakpoint address held by said data break pointer; and a user-accessible register, coupled to said memory controller and responsive to said hit signal, for holding a bit indicating whether a data element to be processed is provided by said cache or said main memory so that the accessible register indicates whether a data element specified by said breakpoint address is provided by said cache memory or said main memory when control is transferred to the debugging routine.

3. A microcomputer according to claim 2 wherein said microcomputer further comprises:

an access control unit for setting an access completion signal indicating that an instruction to be executed or data has not been provided to the processor in the shortest possible access time to indicate that a data element not been accessed from said cache memory;

and wherein said user-accessible register holds a bit indicating whether an access completion signal has been set by said access control unit.

4. A microcomputer according to claim 3 wherein said access control unit includes a counter for counting a number of cycles requires to provide the processor with a data element to be processed, a comparison register for holding a preset value, and a comparator, coupled to said counter and said comparison register, for comparing said number counted by said counter with a preset value and setting said access completion signal when said number is greater than the preset value.

5. A microcomputer according to claim 1 or 2 wherein a plurality of said cache memories are provided and said user-accessible register holds a plurality of bits corresponding to the cache memories.

6. A microcomputer according to claim 1 or 2 wherein said cache memory is included in the microcomputer.

* * * * *